United States Patent [19]

Cottrell

[11] 4,298,118
[45] * Nov. 3, 1981

[54] STICK SEPARATING APPARATUS WITH IMPROVED RADIATION COUNTER

[75] Inventor: Edward D. Cottrell, Cattaraugus, N.Y.

[73] Assignee: Champion International Corporation, Stamford, Conn.

[ * ] Notice: The portion of the term of this patent subsequent to Mar. 27, 1996, has been disclaimed.

[21] Appl. No.: 101,915

[22] Filed: Dec. 10, 1979

[51] Int. Cl.³ .............................................. B65G 47/14
[52] U.S. Cl. .................................... 198/382; 198/425; 198/503; 250/223 R; 250/341
[58] Field of Search ........................ 198/382, 425, 503; 250/341, 223 R

[56] References Cited

U.S. PATENT DOCUMENTS

| | | | |
|---|---|---|---|
| 4,047,033 | 9/1977 | Malmberg et al. | 250/341 |
| 4,062,438 | 12/1977 | Cottrell | 198/425 |
| 4,146,123 | 3/1979 | Cottrell | 198/382 |

Primary Examiner—Joseph E. Valenza
Attorney, Agent, or Firm—Evelyn M. Sommer

[57] ABSTRACT

Apparatus for counting a plurality of pointed sticks and segregating the sticks into groups containing a predetermined count. The sticks are fed onto an endless conveyor belt from either a pointing or alignment station and are counted by a radiation counter either as they are dropped onto, or are delivered in side-by-side relationship on the conveyor. After a predetermined number of sticks are counted, a gate above the conveyor belt is actuated in response to an electronic signal received from the counter to release an accumulated, counted quantity of the sticks for delivery by the conveyor belt to a delivery location. The speed of the conveyor may be increased to space the sticks on the belt from those accumulated behind the gate. The segregated sticks are then manually removed and packaged. In one form of the invention, the use of an infrared counter enables an accurate count to be made even if the sticks are bunched together or lie one on top of the other as they are fed from the pointing station past the counter, while in another form, a special light emitting diode retro-reflective assembly enables an accurate count of the sticks even if disposed in a single layer in side-by-side engagement with each other.

1 Claim, 3 Drawing Figures

STICK SEPARATING APPARATUS WITH IMPROVED RADIATION COUNTER

BACKGROUND OF THE INVENTION

1. Field of the Invention

This invention generally relates to an apparatus for separating articles into groups containing a predetermined number of articles, and more particularly, to an apparatus for separating pointed sticks into such groups to facilitate their unloading from a conveyor and subsequent packaging.

2. Description Of The Prior Art

In my copending application, Ser. No. 703,971 filed July 9, 1976, and entitled "Paper Stick Pointing Apparatus", an apparatus is disclosed for grinding concical points on one end of a plurality of paper sticks. The sticks are used as a holder inserted into a variety of diverse products, such as confections, feminine hygiene tampons, and the like. The ends of the sticks are ground by an abrasive belt positioned at an angle to a chain link conveyor which moves each stick sequentially past the abrasive belt. As the end of each stick is ground, it is rotated on the chain link conveyor.

At the conclusion of the grinding operation, the pointed sticks are fed to a runout conveyor. An operator manually removes and loads a predetermined number of the sticks into a shipping carton. This invention provides an apparatus for segregating the sticks on the conveyor into groups containing a predetermined number of the sticks, e.g., 500, so that an operator may grasp a segragated group of the sticks, remove them from the conveyor, and load them directly into a shipping carton without bothering to count the sticks.

In my copending application Ser. No. 713,882, Filed Aug. 12, 1976, and entitled "Stick Separating Apparatus", the sticks are counted by a photocell arrangement as they are fed from the chain link conveyor at the pointing station to the runout conveyor. After a suitable time delay after the predetermined count is recorded, the photocell arrangement supplies an electrical signal to actuate an air-operated gate between the end of the chain link conveyor and an input end of the runout conveyor to prevent any further sticks from accumulating on the runout conveyor. Simultaneously, the speed of the runout conveyor is increased some fifteen fold to space the sticks on the runout conveyor from the sticks continuing to accumulate behind the gate. The sticks on the runout conveyor can then be manually grasped by an operator, removed from the conveyor, and loaded directly into a shipping carton. The cycle repeats after another group of a predetermined number of the sticks are counted by the photocell arrangement.

The photocell counter is only accurate provided that the sticks are arranged between them so that individual ones of the sticks break a light beam to activate the photocell each time a stick passes between the beam and photocell. However, due to the cylindrical nature of the sticks and the rotation imparted thereto during the grinding of one end thereof at the pointing station, some of the sticks will have a tendency to bunch together or lie one above the other on the chain link conveyor, resulting in a bunch of sticks simultaneously passing the photocell counter, thereby furnishing an inaccurate count.

In U.S. Pat. No. 4,146,123, the entire disclosure of which is hereby incorporated by reference herein, apparatus is disclosed for aligning and stacking the sticks in parallel, side-by-side relationship to each other. The stack of sticks are vibrated to dispense the sticks laterally, still in parallel alignment, onto a conveyor belt to form a single layer of continuously moving sticks which are in side-by-side engagement. In this type of apparatus, however, a photocell type counter such as that described above, cannot be employed to count the sticks as they pass a selected point on the conveyor since there is insufficient spacing between the sticks to break the light beam each time a stick moves therepast.

SUMMARY OF THE INVENTION

In accordance with this invention the sticks are counted by use of either a modulated infrared source in the case of sticks delivered in a bunched arrangement, or by a special light emitting diode retro-reflective assembly in the case of sticks which are delivered in a single layer but in side-by-side engagement with each other. A counting sensor is provided adjacent the conveyor in a correlating position. The signal obtained from the sensor will be a function of the number of sticks passing beneath a source thereof at any given time and is amplified and registered in a conventional manner to operate the cut-off gate and increase the speed of the runout conveyor, providing a more accurate count of a segregated group of the sticks than was possible heretofore, since the count is not dependent on the number of times the source is traversed.

BRIEF DESCRIPTION OF THE DRAWINGS

Further objects and advantages of the invention will become apparent from the following description and claims, and from the accompanying drawing, wherein:

DETAILED DESCRIPTION OF THE INVENTION

Figure 1:
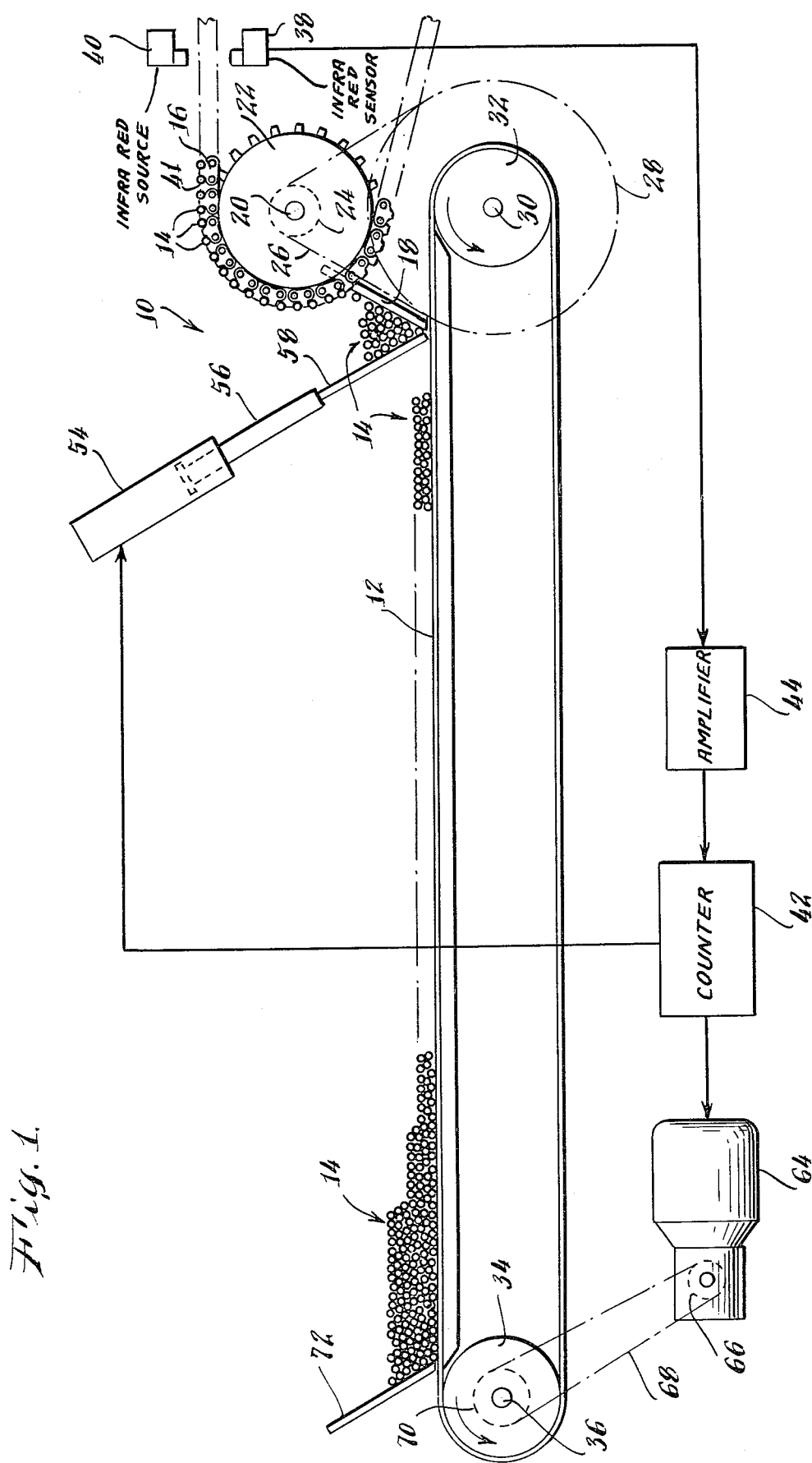
FIG. 1 is a combined schematic and side elevational view of one form of the stick separating apparatus of the present invention.

Referring first to FIG. 1, one form of the stick separating apparatus of the present invention designated by the numeral 10 includes an endless belt runout conveyor 12 for collecting a plurality of sticks 14 having and end ground to a conical tapered point on a chain link conveyor 16.

Runout conveyor 12 is supported beneath one end of chain link conveyor 16 to receive the sticks 14 which roll down an inclined ramp 18 traversing the distance between conveyors 12 and 16. Conveyor 16 is driven by a shaft 20 which rotatably drives a sprocket 22 in mesh between the links of conveyor 16. Shaft 20 also mounts a small pulley 24 connected via a drive belt 26 to a large pulley 28 mounted on a shaft 30. Rotation of shaft 30 causes rotation of a roll 32 fixed to shaft 30 which is frictionally engaged with the endless belt of runout conveyor 12 to drive the conveyor 12 in a counter-clockwise direction as viewed in FIG. 1. The opposite end of conveyor 12 is entrained about an idle roll 34 fixed to a shaft 36.

Chain link conveyor 16 normally travels at approximately 41.6 FPM which is the equivalent of feeding 1000 sticks per minute to runout conveyor 12. Through the ratio of pulleys 24 and 28, the speed of runout conveyor 12 is reduced to a normal operating speed of 10 FPM, thereby permitting sticks 14 to pile up on the input end of conveyor 12.

Sticks 14 are counted by an infrared sensor 38 as the sticks 14 pass beneath an infrared source 40 mounted above the discharge end of conveyor 16. Conveyor 16 includes spaced pockets 41 designed to carry individual ones of the sticks 14, although subsequent to grinding, certain ones of the sticks 14 may leave pockets 41 and bunch or lie one on top of the other. Infrared sensor 38 will generate an electrical signal, however, proportional to the thermal response of the area scanned by the sensor which in turn is proportional in the mass of sticks in the area. This signal is amplified in a conventional manner by amplifier 44 and transmitted to a conventional recycling, fixed count counter 41 which stores the signal until the accumulated response is equivalent to the scan of a predetermined number of sticks e.g., 500. After a suitable time delay, counter 42 emits a single electrical signal to actuate a motor 64 and gate 58. The time delay is preset to approximate the time it takes for the last 500th stick counted on conveyor 16 to reach conveyor 12. When the last stick 14 is counted, counter 42 recycles and begins a new count. A typical sensor 38 suitable for the purpose indicated is manufactured by Scientific Technology Incorporated of Mountainview, California and identified by the model number of 7063C optoswitch. The counter 42 may be one such as that designated by the manufacturer's model number 7907 available from Veeder-Root, Digital Systems Division of Hartford, Conn.

Gate 58 is connected to piston 56 of a puenmatic cylinder 54. Piston 56 is normally urged by a spring (not shown) to a position retracting piston 56 within cylinder 54. As disclosed in my copending application Ser. No. 713,882, a signal from counter 42 will cause air to be admitted from a source of cylinder 54 extending piston 56 and gate 58 to a position adjacent runout conveyor 12 segregating a predetermined number of sticks, e.g., 500, on runout conveyor 12.

At the same time, the signal from counter 42 causes the speed of runout conveyor 12 to increase some fifteen fold to approximately 150 FPM to space the sticks on conveyor 12 from the sticks 14 which continue to accumulate behind the gate 58 under the new count. As disclosed in my copending application, the signal from counter 42 activates a gearhead motor 64. Motor 64 has a pulley 66 counted on its output shaft connected by an endless belt 68 to a pulley 70 mounted on shaft 36. An overrunning clutch bearing (not shown) is installed in the hubs of rolls 34 and 32 which permits the rolls 34 and 32 to overrun in the direction of travel of the endless belt runout conveyor 12. Accordingly, upon activation of motor 64, runout conveyor 12 can be driven by the motor 64 through the belt 68 at a greater speed than furnished by belt 26 drivingly connected to drive shaft 30. Upon activation of motor 64, runout conveyor 12 will be driven by motor 64 at approximately 150 FPM to increase the speed of runout conveyor 12 to space and accumulate the accurately segregated sticks 14 in a pile against a stop 72 mounted at the output end of conveyor 12, substantially as shown in FIG. 1, wherein they can be manually removed and packaged.

Motor 64 is deenergized and cylinder 54 retracts piston 56 and gate 58. Retraction of gate 58 permits the accumulated sticks 14 behind gate 58 to spill onto runout conveyor 12 and the cycle is repeated. Meanwhile, conveyor 12 has returned to normal operating speed.

Figure 2:
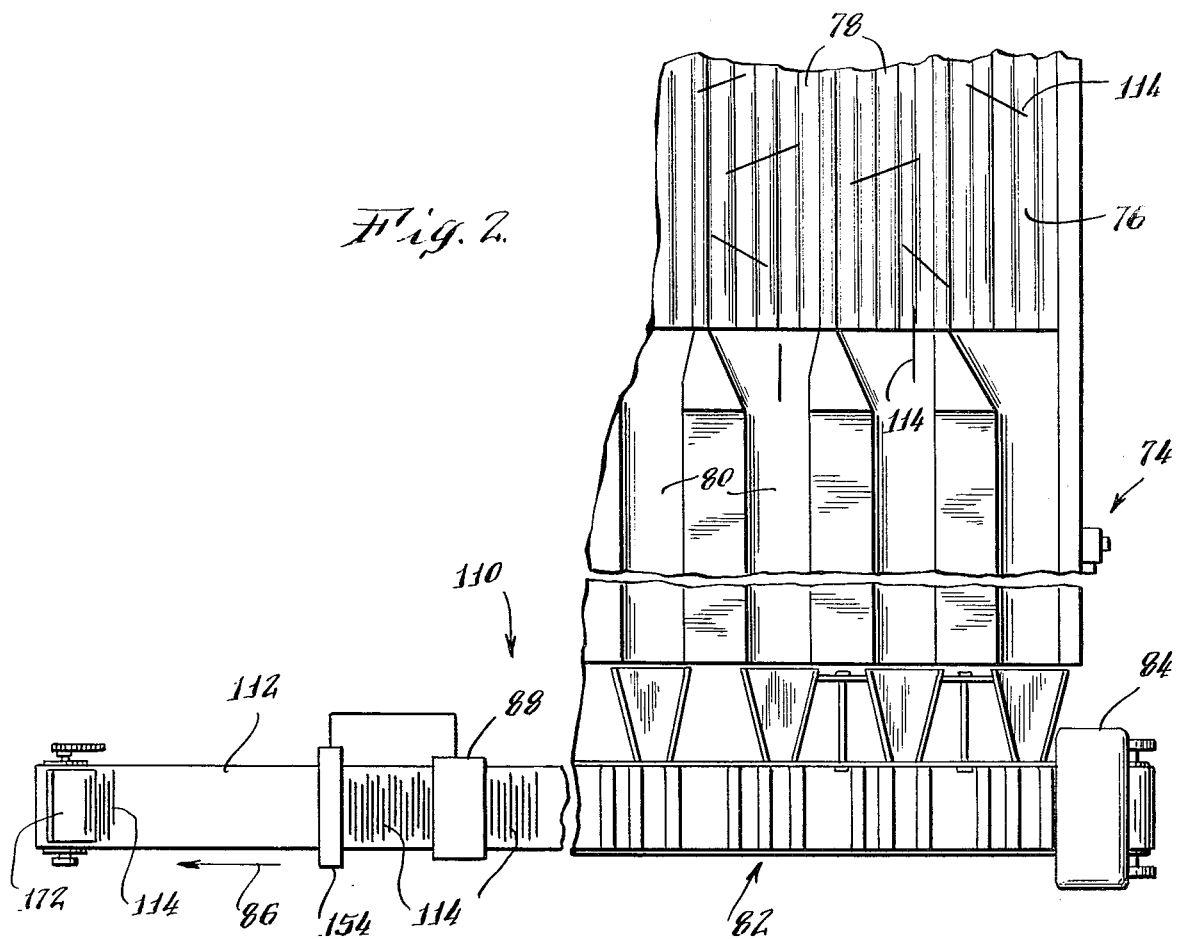
FIG. 2 is a fragmentary top plan view of another form of the stick separating apparatus of the present invention.
Figure 3:
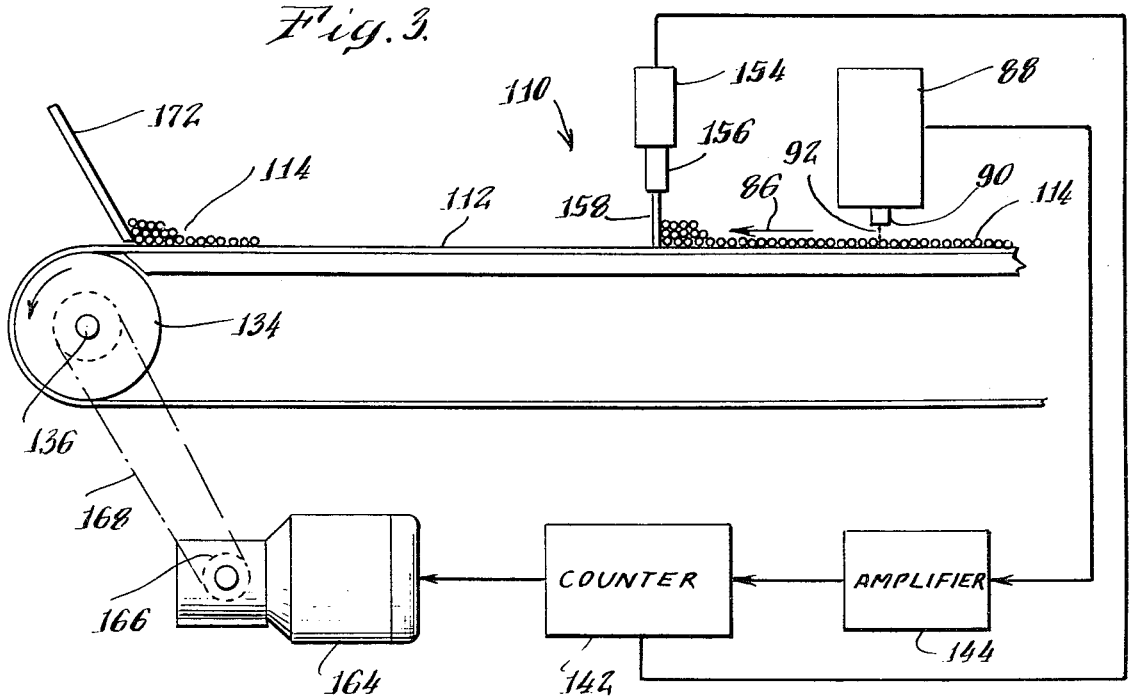
FIG. 3 is a fragmentary side elevational and schematic view of the stick separating apparatus depicted in FIG. 2.

Attention is now directed to FIGS. 2 and 3, wherein another form of the stick separating apparatus is depicted and in which components essentially identical to those shown in FIG. 1 are designated by the same reference numerals preceded by the numeral "1". The stick separating apparatus 110 includes an endless belt runout conveyor 112 for transporting a plurality of sticks 114 from a stick aligning mechanism shown generally by the numeral 74 in FIG. 2.

The construction and operation of the stick aligning mechanism 74 are described in detail in U.S. Pat. No. 4,146,123 and need not be repeated here. However, aligning mechanism 74 will broadly comprise an aligning tray structure 76 for aligning sticks 114 ramdomly scattered thereon into parallel upper channels 78 and lower channels 80. The channels 78 and 80 deliver the longitudinally aligned sticks 114 in nearly a continuous stream thereof to a hopper assembly 82 which is coupled with a vibrator unit 84. The vibrator unit 84 vibrates the hopper assembly to dispense the sticks 114 individually onto the conveyor belt 112 in parallel, side-by-side engagement with each other. The conveyor belt then moves the stream of side-by-side sticks 114 in the direction of the arrow 86 toward a delivery destination adjacent the stop 172.

A sensor 88 is disposed above the conveyor belt 112 downstream from the aligning mechanism and counts the sticks 114 individually as they pass beneath the sensor 88. Sensor 88 comprises a light emitting diode (LED) type retroreflective device 90 which is a item commercially available from the Skan-A-Matic Corporation of Elbridge, New York and identified by the manufacturer's numbers S3010-3 and T41300. The LED device 90 consists of an LED light source surrounded by a sheath of optical glass fibers which transmit reflected light to a photosensing element within the sensing head. In operation, the LED light source of the device 90 functions as a source of optical energy which is directed onto the upper surface of the sticks 114. The amount of optical energy reflected back toward the sensor 88 depends on the position of an individual stick relative to the path 92 taken by the source of optical energy being directed onto the sticks 114. When one of the sticks 114 is vertically aligned with the path 92, a maximum amount of energy will be reflected back toward the sensor 88, whereas the amount of reflected energy substantially decreases when the path is aligned with the point of contact between the sides of adjacent ones of the sticks 114. The sheath of glass fibers of the device 88 senses this change in reflected optical energy and is operative to produce a count signal each time an increase in reflected optical energy is sensed. Minute changes in reflected optical energy may be detected by virtue of the fact that the device 90 possesses an extremely shallow depth of field.

The count signal produced by the sensor 88 is delivered to an amplifier 194 which amplifies such signal and delivers the same to the counter 142 in order to trigger the latter. Counter 142 controls the motor 64 as well as the cylinder 154. The gate 158 remains down in blocking relationship to the flow of sticks 114 until a selected number of the sticks 114 have been counted whereupon the counted sticks accumulated at the gate 158 are allowed to be carried toward the stop 172 when the counter 142 causes the gate 158 to be raised.

What is claimed as new is:

1. An apparatus for receiving a large number of randomly oriented elongated articles and for aligning and separating said articles into groups, each group containing a predetermined number of articles, said apparatus comprising:
   (a) an aligning tray for receiving said randomly oriented articles on the upper surface thereof, said surface having means defining a plurality of parallel elongated channels, each of said channels being open at one end and closed at the other end, said tray including a first portion wherein said means defining said channels comprises a convoluted surface forming, in cross section, channels having generally rounded bottom surfaces and generally rounded walls between said channels, and a second portion wherein said means defining said channels defines a plurality of spaced-apart channels each having generally rounded bottom surfaces lower than said rounded bottom surfaces formed by said convoluted surface and a plurality of separators between said spaced apart channels, with the number of channels in said second portion being smaller than the number of channels in said first portion;
   (b) means for supporting and repetitively reciprocating said tray in a direction having a component of movement in the longitudinal direction of said channels to cause said articles to enter said channels and move lengthwise toward and out of said open ends;
   (c) a plurality of hopper means for receiving articles from said tray, each of said hopper means including an upwardly opening compartment having side walls and a bottom wall, one of said side walls having means defining an exit opening through which articles can pass in a direction perpendicular to their lengths; said hopper means further including a plurality of chutes, equal in number to the number of channels in said second portion of the tray, said chutes being mounted for vibratory movement with said compartments and extending downwardly between said open ends of said channels in said second portion of the tray and said compartments, with the number of said compartments also being equal to the number of channels in said second portion of the tray;
   (d) means for supporting said hoppr means adjacent to and below said open ends independently of said tray to receive aligned articles emerging from said open ends, said means for supporting including means for vertically vibrating said hopper means;
   (e) belt conveyor means movable below said hopper means to receive said articles and to convey said articles in their aligned side by side arrangment perpendicular to the direction of their lengths to said receiving location;
   (f) counting means including light emitting diode sensing means adjacent said hopper means for counting a predetermined number of articles being fed to and disposed on said conveyor means, said sensing means including a source of optical energy adapted to be directed onto said articles carried on said conveyor means, said sensing means further including receiving means disposed adjacent said optical energy source and spaced above said conveyor means for detecting the amount of optical energy reflected by said articles, whereby said sensing means is operable to produce a counting signal each time one of said articles is counted thereby, said signal being generated as a function of reflected light only, such that said conveyor means may be continuous, said counting means further including a counter coupled with said sensing means for receiving and counting said counting signals; and
   (g) means under control of said counting means for segregating said predetermined number of articles counted by said counting means from a like number counted thereafter.

* * * * *